(12) United States Patent
Matsumoto

(10) Patent No.: US 7,669,612 B2
(45) Date of Patent: Mar. 2, 2010

(54) PIPE COUPLING AND MALE COUPLING MEMBER

(75) Inventor: Koji Matsumoto, Ohta-ku (JP)

(73) Assignee: Nitto Kohki Co., Ltd., Tokyo (JP)

( * ) Notice: Subject to any disclaimer, the term of this patent is extended or adjusted under 35 U.S.C. 154(b) by 404 days.

(21) Appl. No.: 11/796,070

(22) Filed: Apr. 26, 2007

(65) Prior Publication Data

US 2008/0011369 A1 Jan. 17, 2008

Related U.S. Application Data

(63) Continuation of application No. PCT/JP2005/018814, filed on Oct. 12, 2005.

(30) Foreign Application Priority Data

Oct. 29, 2004 (JP) .............................. 2004-315423

(51) Int. Cl.
*F16L 37/36* (2006.01)
(52) U.S. Cl. .................... 137/614.06; 137/614.01; 137/614.05; 137/271; 251/149.9
(58) Field of Classification Search ................ 137/271, 137/614.01, 614.05, 614.06; 251/149.6, 251/149.9; 285/12
See application file for complete search history.

(56) References Cited

U.S. PATENT DOCUMENTS

| | | | | |
|---|---|---|---|---|
| 3,367,366 A | * | 2/1968 | Klatte et al. ........... | 137/614.05 |
| 4,327,770 A | * | 5/1982 | Brown et al. ........... | 137/614.05 |
| 4,763,683 A | * | 8/1988 | Carmack ................ | 137/614.01 |
| 5,074,524 A | * | 12/1991 | Wade ...................... | 251/149.6 |
| 5,095,947 A | | 3/1992 | Weh et al. | |
| 6,035,894 A | | 3/2000 | Weh et al. | |
| 7,537,246 B2 | * | 5/2009 | Mikiya et al. ............ | 251/149.6 |
| 2004/0189005 A1 | * | 9/2004 | Mikiya et al. ............... | 285/276 |
| 2006/0118184 A1 | * | 6/2006 | Mikiya et al. .......... | 137/625.22 |

FOREIGN PATENT DOCUMENTS

| | | |
|---|---|---|
| JP | 2-53592 U | 4/1990 |
| JP | 6-123391 A | 5/1994 |
| JP | 2001-41381 A | 2/2001 |
| JP | 2002-228070 A | 8/2002 |
| JP | 2003-97782 A | 4/2003 |

OTHER PUBLICATIONS

International Preliminary Report issued May 1, 2007.

* cited by examiner

*Primary Examiner*—John Rivell
*Assistant Examiner*—Craig Price
(74) *Attorney, Agent, or Firm*—Brinks Hofer Gilson & Lione

(57) ABSTRACT

A male coupling member is provided that is selectively couplable to a first female coupling member (for 25 MPa, for example) and a second female coupling member (for 90 MPa), which handle different fluid pressures. When the male coupling member is coupled to the first female coupling member, a second O-ring that is provided for the second female coupling member is prevented from being displaced by the fluid supplied from the first female coupling member. A through-hole (70) is provided therein with an O-ring retaining member (82) that is displaceable between an advance position

9 Claims, 6 Drawing Sheets

PIPE COUPLING AND MALE COUPLING MEMBER

This application is a continuation of PCT/JP2005/018814, filed Oct. 12, 2005, which claims priority to Japanese Application No. JP2004-315423, filed Oct. 29, 2004. The entire contents of these applications are incorporated herein by reference.

FIELD OF THE INVENTION

The present invention relates to pipe couplings and, more particularly, to a pipe coupling that handles a high-pressure fluid such as gaseous hydrogen.

BACKGROUND OF THE INVENTION

It is common practice for fuel cell vehicles that gaseous hydrogen stored at high pressure in a storage tank at a gas station or the like is filled into their vehicular tanks. At present, the pressure of gaseous hydrogen stored in the storage tank is standardized to be 25 MPa or 35 MPa.

A pipe coupling that handles such a high-pressure fluid is arranged as follows. A female coupling member receives a tubular forward end portion of a male coupling member into a tubular forward end portion thereof. In this state, a coupling locking mechanism is acted upon from the outside of the tubular forward end portion of the male coupling member to lock the male coupling member to the female coupling member in coupled relation. In addition, an axially displaceable tubular valving element is provided in the tubular forward end portion of the female coupling member. When the male coupling member and the female coupling member are coupled and locked in coupled relation, the valving element is inserted into a valving element receiving part formed at a forward end portion of a through-hole longitudinally extending through the male coupling member. Thus, the valving element hermetically engages an O-ring attached to the through-hole wall surface that defines the valving element receiving part, and the valving element is displaced backward, whereby the through-hole (fluid passage) of the pipe coupling is opened. That is, the fluid is allowed to flow between the male coupling member and the female coupling member through the tubular valving element. Pipe couplings arranged as stated above are disclosed, for example, in Japanese Patent Number 2694302, Japanese Patent Application Publication No. 2003-97782 and Published Japanese Translation of PCT International Publication for Patent Application No. 2000-515953.

When a high-pressure fluid is to be supplied from a storage tank to a vehicular tank, a female coupling member connected to the storage tank is coupled to a male coupling member connected to the vehicular tank. Regarding male coupling members, it is specified that those manufactured according to 25 MPa pressure specifications shall be able to couple only to female coupling members manufactured according to 25 MPa pressure specifications and unable to couple to female coupling members according to 35 MPa pressure specifications, and that male coupling members according to 35 MPa pressure specifications shall be able to couple not only to female coupling members according to 35 MPa pressure specifications but also to those according to 25 MPa pressure specifications.

To achieve differentiation in coupling between male and female coupling members as stated above, according to one method, the forward end portions of female coupling members manufactured according to the 35 MPa pressure specifications are made longer than those of female coupling members according to the 25 MPa pressure specifications. Meanwhile, male coupling members manufactured according to the 35 MPa pressure specifications have a tubular forward end portion with a length that allows it to be inserted as far as the coupling locking position in the tubular forward end portion of a female coupling member regardless of whether it complies with the 25 MPa or 35 MPa pressure specifications. Male coupling members manufactured according to the 25 MPa pressure specifications have a tubular forward end portion with a length that allows it to be inserted as far as the coupling locking position in the tubular forward end portion of only a female coupling member according to the 25 MPa pressure specifications.

In this case, both female coupling members complying with the 25 MPa and 35 MPa pressure specifications have tubular valving elements of the same diameter for male coupling members. When a male coupling member is inserted into and coupled to either of the female coupling members, the valving element is inserted into a valving element receiving part provided in the male coupling member and hermetically engaged with an O-ring fitted to the wall surface of the valving element receiving part.

Recently, standardization of higher fluid pressures such as 50 MPa and 70 MPa has been under discussion. When handling a fluid under a pressure of 50 MPa or 70 MPa, differentiation in coupling between female and male coupling members can be achieved in the same way as the above. The tubular valving element for passing a fluid, however, needs to ensure the pressure resistance required therefor by reducing the diameter of the fluid passage extending therethrough. Consequently, the outer diameter of the tubular valving element also becomes small as compared with those handling a fluid pressure of 25 MPa or 35 MPa. Accordingly, the male coupling member requires a valving element receiving part for receiving the valving element with a reduced diameter and hence needs an O-ring that is provided in this valving element receiving part to hermetically engage the valving element.

When a male coupling member having valving element receiving parts with different diameters as stated above is coupled to a female coupling member according to the 25 MPa or 35 MPa pressure specifications, the valving element of the female coupling member is not inserted into the valving element receiving part for a female coupling member according to the 50 MPa or 70 MPa pressure specifications. Consequently, the O-ring for the valving element of a female coupling member according to the 50 MPa or 70 MPa pressure specifications is subjected to a fluid pressure of 25 MPa or 35 MPa and hence likely to detach from the wall surface of the valving element receiving part. Therefore, when the male coupling member is coupled to a female coupling member according to the 50 MPa or 70 MPa pressure specifications, the valving element may fail to be hermetically engaged with the O-ring, which is dangerous.

SUMMARY OF THE INVENTION

An object of the present invention is to provide a pipe coupling capable of safely handling female coupling members for high-pressure fluid that are manufactured according to the 50 MPa and 70 MPa pressure specifications while enabling coupling with female coupling members according to the 25 MPa and 35 MPa pressure specifications, and also provide a male coupling member of the pipe coupling.

That is, the present invention provides a male coupling member (10) selectively couplable to a first female coupling member (14) and a second female coupling member (12). The first and second female coupling members each include a tubular female coupling member body (20) having a through-hole extending from the forward end to the rear end thereof. A forward end portion of the through-hole is defined as a male coupling member receiving part (denoted by reference numeral 22 in the description of the illustrated embodiments). A valving element (44, 44') is provided in the through-hole to extend in the axial direction of the through-hole. The valving element is displaceable between a close position where it closes the through-hole and an open position where the valving element opens the through-hole at the rear of the close position. The forward end portion of the valving element of the first female coupling member has a first outer diameter, and the forward end portion of the valving element of the second female coupling member has a second outer diameter smaller than the first outer diameter. The male coupling member includes a tubular male coupling member body (72) having a through-hole (70) extending from the forward end to the rear end thereof. The male coupling member body has a forward end portion with an outer diameter that allows the forward end portion to be slidably inserted into the male coupling member receiving part (22) of the female coupling member body of either of the first and second female coupling members. The through-hole (70) has a first valving element receiving part (70-1) and a second valving element receiving part (70-2) formed in order from the forward end toward the rear end thereof. The first valving element receiving part receives the forward end portion of the valving element (44') of the first female coupling member (14) while slidably engaging it when the male coupling member body is slidably inserted into the male coupling member receiving part (22) of the first female coupling member. The second valving element receiving part receives the forward end portion of the valving element (44) of the second female coupling member (20) while slidably engaging it when the male coupling member body is slidably inserted into the male coupling member receiving part (22) of the second female coupling member. A first O-ring (76) and a second O-ring (78) are fitted to the wall surface of the through-hole (70). The first O-ring hermetically engages the outer peripheral surface of the forward end portion of the valving element (44') of the first female coupling member (14) received in the first valving element receiving part (70-1). The second O-ring (78) hermetically engages the outer peripheral surface of the forward end portion of the valving element of the second female coupling member passed through the second valving element receiving part. The through-hole (70) is provided therein with an O-ring retaining member (82) that is displaceable between an advance position (FIG. 3) where the O-ring retaining member is positioned radially inside the second O-ring (78) to prevent the second O-ring (78) from being displaced backward by a fluid flowing from the first female coupling member (14) through the through-hole (70) when the male coupling member is coupled to the first female coupling member (14), and a retract position (FIG. 1) where when the male coupling member is coupled to the second female coupling member (20), the O-ring retaining member is displaced backward by the forward end of the valving element (44) of the second female coupling member, thereby allowing the outer peripheral surface of the forward end of the valving element (44) to hermetically engage the second O-ring (78). The through-hole (70) is further provided therein with urging means (86, 86') for urging the O-ring retaining member into the advance position.

Specifically, the O-ring retaining member (82) may have a part that is positioned radially inside the second O-ring (78) to prevent displacement of the second O-ring when the O-ring retaining member is in the advance position.

More specifically, the arrangement may be as follows. The through-hole (70) has an O-ring fitting part (70-3) at the rear of the second valving element receiving part (70-2). The O-ring fitting part has a larger diameter than that of the second valving element receiving part. The O-ring fitting part (70-3) has a tubular O-ring fitting member (80) that is inserted and secured therein concentrically therewith to fit the second O-ring (78) in the O-ring fitting part.

In this case, the O-ring fitting part (70-3) preferably has a smaller diameter than that of the first valving element receiving part (70-1).

The O-ring retaining member (82) may be a tubular member axially displaceably fitted in the O-ring fitting part (70-3) and pressed forward of the male coupling member by urging means to engage the O-ring fitting member to reach the advance position (FIG. 3).

In this case, the arrangement may be as follows. When in the advance position, the O-ring retaining member (82) extends so as to contact the inner peripheral surface of the O-ring fitting member (80) to cover the second O-ring (78) from the radially inner side thereof.

In another embodiment, the male coupling member may be arranged as follows. The through-hole (70') has a ring retaining member fitting part (70'-3) at the rear of the second valving element receiving part (70'-2). The ring retaining member fitting part (70'-3) has a larger diameter than that of the second valving element receiving part (70'-2). The O-ring retaining member (82') has a first tubular portion (82'-1) extending in the axial direction so as to cover the second O-ring (78') from the radially inner side thereof when the O-ring retaining member (82') is in the advance position (FIG. 5). The O-ring retaining member (82') further has a second tubular portion (82'-2) that contiguously extends from the rear end of the first tubular portion and that is slidable in the axial direction in the ring retaining member fitting part.

In this case, the male coupling member body preferably has a vent hole (72'-1) that allows, when the O-ring retaining member (82') is in the retract position, ventilation between a space (88) defined by the first tubular portion (82'-1) of the O-ring retaining member and the wall surface of the ring retaining member fitting part (70'-3) and the outside of the male coupling member body.

In addition, the present invention provides a pipe coupling including a first female coupling member and a second female coupling member. The first and second female coupling members each include a tubular female coupling member body having a through-hole extending from the forward end to the rear end thereof. A forward end portion of the through-hole is defined as a male coupling member receiving part. A valving element is provided in the through-hole to extend in the axial direction of the through-hole. The valving element is displaceable between a close position where it closes the through-hole and an open position where the valving element opens the through-hole at the rear of the close position. The forward end portion of the valving element of the first female coupling member has a first outer diameter, and the forward end portion of the valving element of the second female coupling member has a second outer diameter smaller than the first outer diameter. The pipe coupling further includes a male coupling member selectively couplable to the first and second female coupling members. The male coupling member includes a tubular male coupling member body having a through-hole extending from the forward end to the rear end thereof. The male coupling member body has a forward end portion with an outer diameter that allows the forward end portion to be slidably inserted into the male coupling member receiving part of the female coupling member body of either of the first and second female coupling members. The through-hole has a first valving element receiving part and a second valving element receiving part formed in order from the forward end toward the rear end thereof. The first valving element receiving part receives the forward end portion of the valving element of the first female coupling member while slidably engaging it when the male coupling member body is slidably inserted into the male coupling member receiving part of the first female coupling member. The second valving element receiving part receives the forward end portion of the valving element of the second female coupling member while slidably engaging it when the male coupling member body is slidably inserted into the male coupling member receiving part of the second female coupling member. A first O-ring and a second O-ring are fitted to the wall surface of the through-hole. The first O-ring hermetically engages the outer peripheral surface of the forward end portion of the valving element of the first female coupling member received in the first valving element receiving part. The second O-ring hermetically engages the outer peripheral surface of the forward end portion of the valving element of the second female coupling member passed through the second valving element receiving part. The through-hole is provided therein with an O-ring retaining member that is displaceable between an advance position where the O-ring retaining member is positioned radially inside the second O-ring to prevent the second O-ring from being displaced backward by a fluid flowing from the first female coupling member through the through-hole when the male coupling member is coupled to the first female coupling member, and a retract position where when the male coupling member is coupled to the second female coupling member, the O-ring retaining member is displaced backward by the forward end of the valving element of the second female coupling member, thereby allowing the outer peripheral surface of the forward end of the valving element to hermetically engage the second O-ring. The through-hole is further provided therein with urging means for urging the O-ring retaining member into the advance position.

Specifically, the arrangement may be as follows. The O-ring retaining member has a part that is positioned radially inside the second O-ring to prevent displacement of the second O-ring when the O-ring retaining member is in the advance position. The through-hole has an O-ring fitting part at the rear of the second valving element receiving part. The O-ring fitting part has a diameter that is larger than that of the second valving element receiving part but smaller than that of the first valving element receiving part. The O-ring fitting part has a tubular O-ring fitting member that is inserted and secured therein concentrically therewith to fit the second O-ring in the O-ring fitting part. The O-ring retaining member is a tubular member axially displaceably fitted in the O-ring fitting part and pressed forward of the male coupling member by the urging means to engage the O-ring fitting member to reach the advance position.

In the present invention, the male coupling member is adapted to be couplable to either of at least two female coupling members that handle fluids under different pressures. When the male coupling member is coupled to the female coupling member (12) that handles a fluid under a relatively high pressure, the valving element (44) of the female coupling member (12) is received in the second valving element receiving part (70-2, 70'-2) and hermetically engaged with the O-ring (78, 78') fitted to the wall surface of the second valving element receiving part to prevent leakage of the fluid between the male and female coupling members. When the male coupling member is coupled to the female coupling member (12') that handles a fluid under a relatively low pressure, the valving element of the female coupling member is received in the first valving element receiving part (70-1, 70'-1) and hermetically engaged with the first O-ring (76, 76') fitted in the first valving element receiving part to prevent leakage of the fluid between the male and female coupling members. At this time, the O-ring retaining member (82, 82') is placed in the advance position to prevent displacement of the O-ring (78, 78') by the fluid flowing into the male coupling member from the female coupling member. Accordingly, the male coupling member can be coupled to either of the above-described two female coupling members without any problem.

DETAILED DESCRIPTION OF THE PREFERRED EMBODIMENT

Embodiments of the pipe coupling according to the present invention will be described below with reference to the accompanying drawings.

Figure 1:
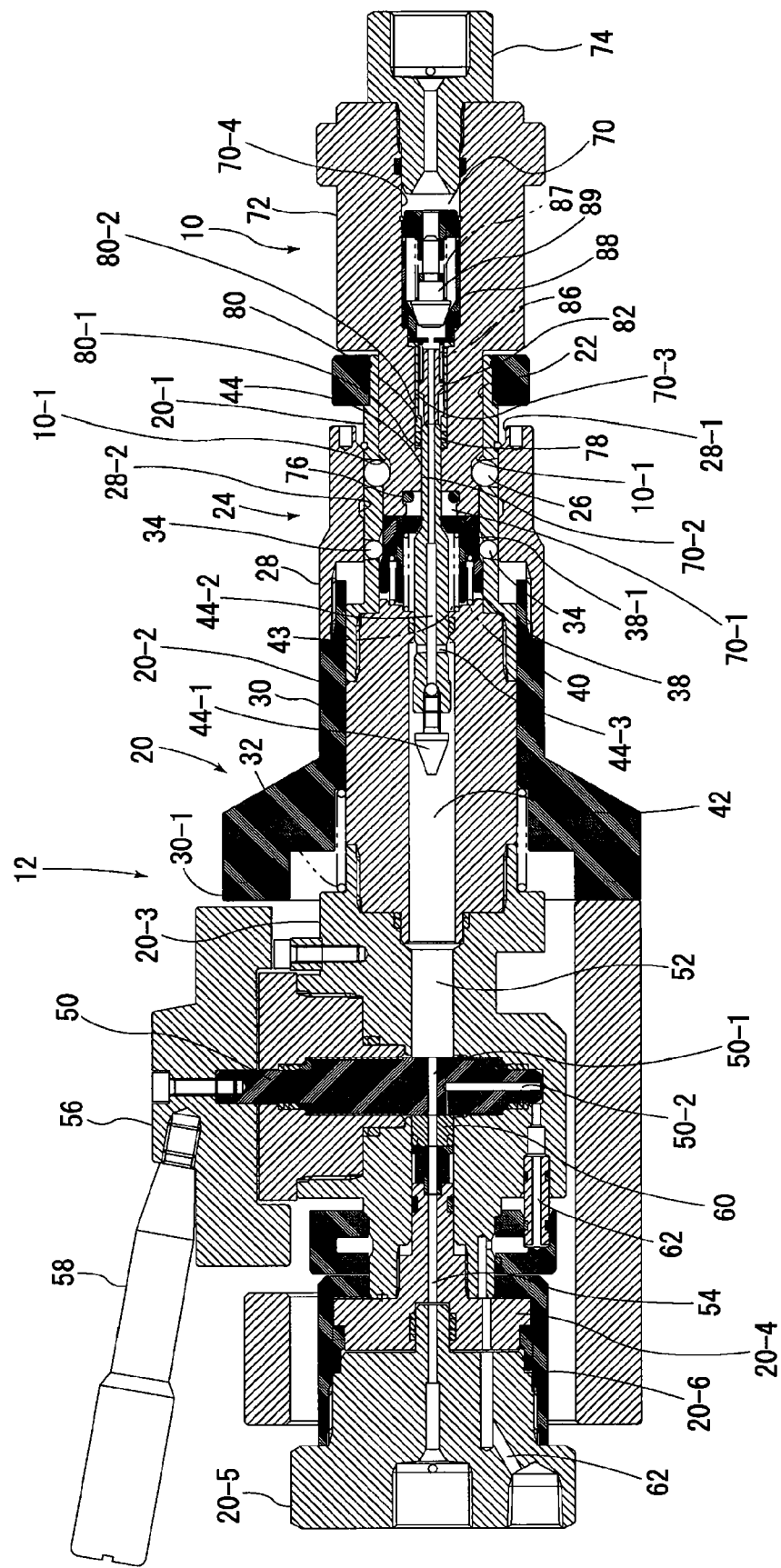
FIG. 1 is a longitudinal sectional view showing a state where a male coupling member according to the present invention and a female coupling member are coupled to each other.
Figure 2:
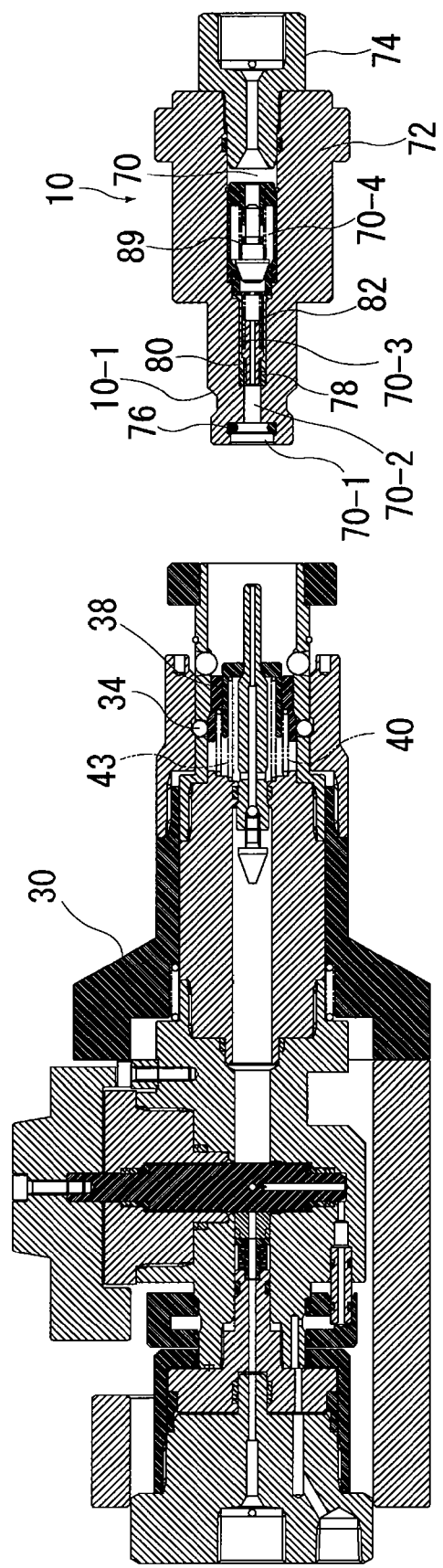
FIG. 2 is a longitudinal sectional view showing a state where the male coupling member and the female coupling member are disengaged from each other.
Figure 3:
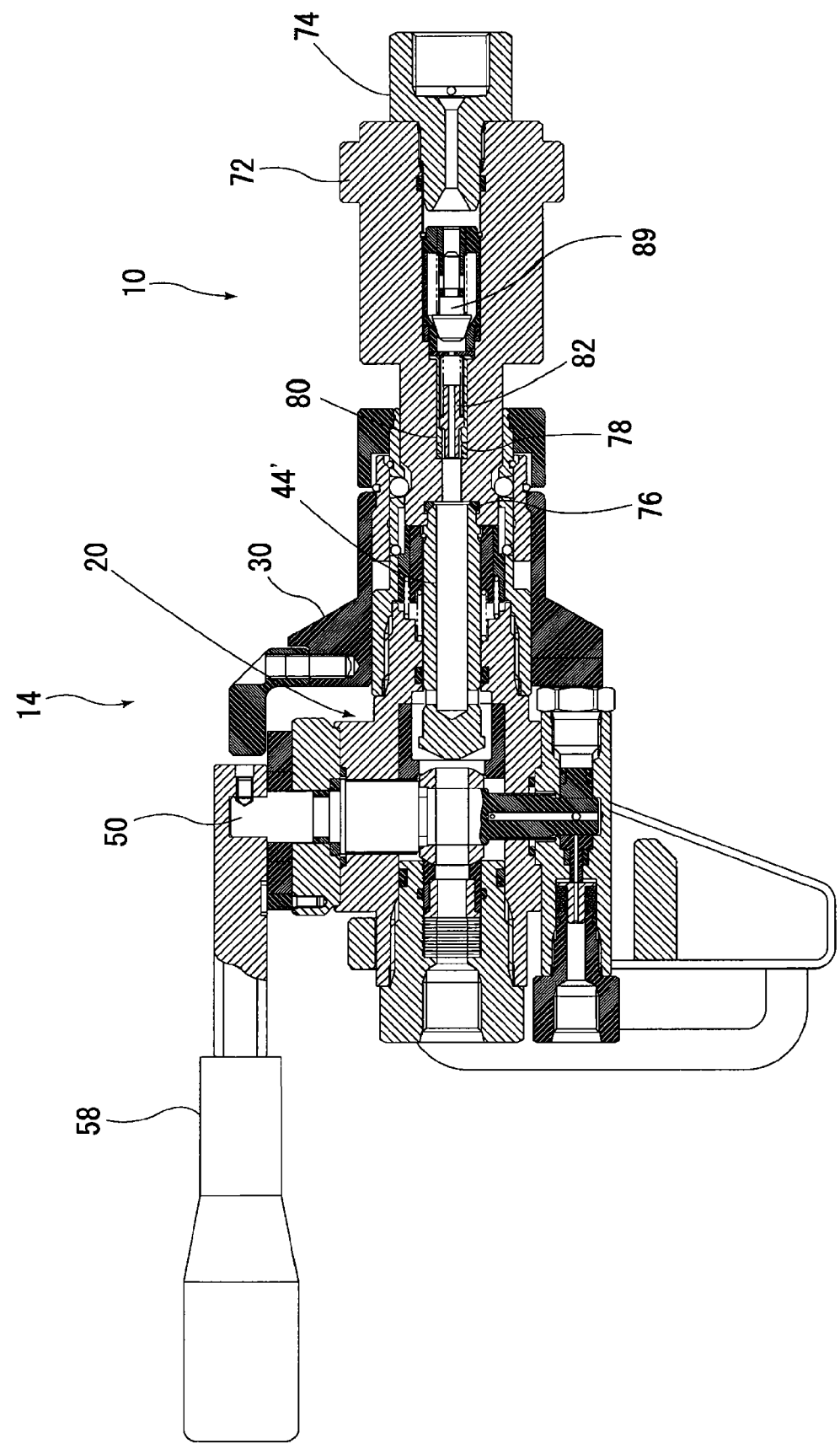
FIG. 3 is a longitudinal sectional view showing a state where a female coupling member handling a fluid under a lower pressure than the female coupling member shown in FIGS. 1 and 2 is coupled to the same male coupling member as that shown in FIGS. 1 and 2.

FIG. 1 is a longitudinal sectional view showing a state where a male coupling member 10 according to the present invention is coupled to a female coupling member 12 for a high-pressure fluid such as gaseous hydrogen under a pressure of 50 MPa or 70 MPa, for example. FIG. 2 is a longitudinal sectional view showing a state where the female coupling member 12 shown in FIG. 1 is disengaged from the male coupling member 10. FIG. 3 is a longitudinal sectional view showing a state where the male coupling member 10 is coupled to a female coupling member 14 for a fluid under a relative lower pressure than the above-described fluid, i.e. 25 MPa or 35 MPa.

The female coupling member 12 and the female coupling member 14 have basically the same structure. That is, the female coupling members 12 and 14 have a female coupling member body 20 that is tubular as a whole. Specifically, the female coupling member body 20 consists essentially of a first body member 20-1, a second body member 20-2, a third body member 20-3, and a fourth body member 20-4, which are successively disposed from the forward end toward the rear end thereof and connected to each other by thread engagement. An adapter 20-5 is connected to the fourth body member 20-4 by a connecting cap 20-6. The adapter 20-5 is connected with a pipe from a high-pressure fluid storage tank (not shown).

The first body member 20-1 has a male coupling member receiving part 22 for receiving the male coupling member 10 and locking means 24 (for locking the male coupling member 10 received in the male coupling member receiving part 22). The locking means 24 has spherical locking elements 26 radially displaceably fitted in radial through-holes provided in the first body member 20-1. The locking means 24 further has an actuating sleeve 28 for actuating the locking elements 26. The actuating sleeve 28 is provided on the outer peripheral surface of the first body member 20-1 displaceably in the axial direction thereof. The actuating sleeve 28 enables the locking elements 26 to be displaced between a locking position and an unlocking position. In the locking position, as shown in FIG. 1, the locking elements 26 engage under pressure in a locking recess, i.e. an annular groove 10-1, formed on the outer peripheral surface of the male coupling member 10 inserted in the male coupling member receiving part 22, thereby locking the male coupling member 10 to the female coupling member 12. In the unlocking position, as shown in FIG. 2, the locking elements 26 are received in an annular recess 28-1 formed on the inner peripheral surface of the forward end of the actuating sleeve 28, thereby allowing the male coupling member 10 to be axially displaced in the male coupling member receiving part 22. The actuating sleeve 28 is in thread engagement with a tubular member 30 provided on the outer periphery of the second body member 20-2 displaceably in the axial direction thereof. The actuating sleeve 28 is urged rightward (as seen in the figure), together with the tubular member 30, by a compression spring 32 installed between the tubular member 30 and the third body member 20-3. When the male coupling member 10 is not inserted in the female coupling member 12 (FIG. 2), the actuating sleeve 28 is placed in the unlocking position. In the unlocking position, spherical sleeve locking elements 34 fit in an annular groove 28-2 formed on the inner peripheral surface of the actuating sleeve 28, thereby holding the actuating sleeve 28 in the unlocking position. That is, the sleeve locking elements 34 are supported by a support tube 38 that is slidable along the inner peripheral surface of the first body member 20-1. The support tube 38 is urged rightward by a compression spring 40 installed between the support tube 38 and the second body member 20-2. When the male coupling member 10 is not inserted in the female coupling member 12, the support tube 38 allows the sleeve locking elements 34 to be displaced radially outward to engage in the annular groove 28-2 of the actuating sleeve 28. The support tube 38 is displaced leftward by the forward end of the male coupling member 10 inserted into the female coupling member 12. Consequently, a reduced-diameter portion 38-1 formed on the outer peripheral surface of the support tube 38 engages and supports the sleeve locking elements 34, causing the sleeve locking elements 34 to disengage from the annular groove 28-2 on the actuating sleeve inner peripheral surface, thereby allowing the actuating sleeve 28 to be moved rightward by the compression spring 32 to reach the locking position as shown in FIG. 1.

The second body member 20-2 has a fluid passage 42 communicating with the male coupling member receiving part 22 of the first body member 20-1 and further has a tubular first valving element 44 for opening and closing the fluid passage 42. The valving element 44 has an axial hole 44-2 that extends axially from the forward end (right end as seen in the figure) thereof and that is closed at the rear end thereof by a closing member 44-1. The valving element 44 further has radial holes 44-3 extending radially from a rear end portion of the axial hole 44-2 to open on the outer peripheral surface of the valving element 44. When the valving element 44 is in the position shown in FIG. 2, the radial holes 44-3 open into the male coupling member receiving part 22. When the valving element 44 is in the position shown in FIG. 1, the radial holes 44-3 communicate with the fluid passage 42 in the second body member 20-2. Accordingly, when in the position shown in FIG. 1, the valving element 44 is in an open position where it provides communication between the male coupling member receiving part 22 and the fluid passage 42. When in the position shown in FIG. 2, the valving element 44 is in a close position where it cuts off the communication between the male coupling member receiving part 22 and fluid passage 42. Reference numeral 43 denotes a compression spring that urges the valving element 44 into the close position.

The third body member 20-3 has a shaft-shaped valving element 50 vertically fitted therein rotatably about its own axis. The shaft-shaped valving element 50 has a through-hole 50-1 extending horizontally. The shaft-shaped valving element 50 is rotatable between an open position (FIG. 1) where the through-hole 50-1 provides communication between a fluid passage 52 in the third body member 20-3 and a fluid passage 54 in the fourth body member 20-4 and a close position (FIG. 2) where the shaft-shaped valving element 50 is rotated through 90 degrees from the open position to cut off the communication between the fluid passages 52 and 54. In the illustrated example, a rotating cam member 56 is secured to the upper end of the shaft-shaped valving element 50, and a rotating lever 58 is attached to the rotating cam member 56. When the female coupling member 12 is not coupled to the male coupling member 10, as shown in FIG. 2, a left end portion 30-1 of the tubular member 30 is positioned in close proximity to the rotating cam member 56 to prevent rotation of the rotating cam member 56. When the female coupling member 12 is coupled to the male coupling member 10, as shown in FIG. 1, and, consequently, the tubular member 30 and the actuating sleeve 28 are displaced rightward, as stated above, the left end portion 30-1 of the tubular member 30 moves away from the rotating cam member 56 to permit rotation of the rotating cam member 56. That is, in this pipe coupling, the shaft-shaped valving element 50 can be rotated to the open position (FIG. 1) with the rotating lever 58 only when the male coupling member 10 and the female coupling member 12 are coupled to each other as shown in FIG. 1.

The shaft-shaped valving element 50 has a residual pressure discharge bore 50-2. When the shaft-shaped valving element 50 is in the open position shown in FIG. 1, a radial extension portion of the residual pressure discharge bore 50-2 is sealed by a tubular sealing member 60 provided between the shaft-shaped valving element 50 and the fourth body member 20-4. When the shaft-shaped valving element 50 is in the close position shown in FIG. 2, the radial extension portion of the residual pressure discharge bore 50-2 communicates with the fluid passage 52, thereby allowing the fluid pressure remaining in the fluid passage to be discharged through residual pressure discharge bores 62 formed in the third body member 20-3, the fourth body member 20-4 and the adapter 20-5.

The female coupling member 14 shown in FIG. 3 has substantially the same structure as that of the female coupling member 12 shown in FIGS. 1 and 2 but handles a fluid under a pressure of 25 MPa or 35 MPa, which is lower than the pressure (50 MPa or 70 MPa) of a fluid that the female coupling member 12 handles. Therefore, the female coupling member 14 can be provided with a necessary pressure resistance even if the wall thickness thereof is reduced in comparison to the female coupling member 12. For this reason, the diameter of a fluid passage extending through the female coupling member 14 is made larger than in the case of the female coupling member 12, and hence the diameter of a valving element 44' for opening and closing the fluid passage is also made larger.

The male coupling member 10 is selectively couplable to the female coupling member 12 shown in FIGS. 1 and 2 and the female coupling member 14 shown in FIG. 3.

That is, the male coupling member 10 has a tubular male coupling member body 72 whose forward end portion has an outer diameter that allows it to be slidably inserted into either of the male coupling member receiving parts 22 of the above-described first and second female coupling members 12 and 14. The male coupling member body 72 has a through-hole 70 extending from the forward end to the rear end thereof (from the left to the right in the figures). The male coupling member 10 further has an adapter 74 that is connected to the rear end of the male coupling member body 72 by thread engagement. The adapter 74 is connected with a pipe (from a vehicular tank or the like, which is not shown).

The through-hole 70 has a first valving element receiving part 70-1, a second valving element receiving part 70-2, an O-ring fitting part 70-3, and a valve fitting part 70-4 formed in order from the forward end toward the rear end thereof. The first valving element receiving part 70-1 receives the forward end portion of the valving element 44' of the female coupling member 14 while slidably engaging this forward end portion. The second valving element receiving part 70-2 receives the forward end portion of the valving element 44 of the female coupling member 12 while slidably engaging this forward end portion. The O-ring fitting part 70-3 has a diameter larger than that of the second valving element receiving part 70-2 but smaller than that of the first valving element receiving part 70-1. The valve fitting part 70-4 extends from the O-ring fitting part 70-3 to the rear end of the male coupling member 10. An adapter 74 is connected to the rear end of the valve fitting part 70-4 by thread engagement. The adapter 74 is connected with a pipe from a tank supplied with a high-pressure fluid (mounted on a vehicle or the like, which is not shown).

A first O-ring 76 is fitted in a rear end portion of the first valving element receiving part 70-1 to hermetically engage the outer peripheral surface of the forward end portion of the valving element 44' of the female coupling member 14 inserted into the first valving element receiving part 70-1. The O-ring fitting part 70-3 has a tubular O-ring fitting member 80 that is inserted and secured therein concentrically therewith to fit a second O-ring 78 in the O-ring fitting part 70-3. In the illustrated example, the O-ring fitting member 80 consists a first portion 80-1 and a second portion 80-2 that are adapted to sandwich the O-ring 78 from both sides in the longitudinal direction. The portions of the O-ring fitting member 80 that sandwich the O-ring 78 from both longitudinal sides have the same inner diameter as that of the second valving element receiving part 70-2. The rest of the second portion 80-2 is formed in a thin-walled tubular shape. The rear end of the second portion 80-2 extends radially outward to engage a stepped portion between the O-ring fitting part 70-3 and the valve fitting part 70-4.

An axially displaceable, tubular O-ring retaining member 82 is provided on the inner peripheral surface of the second portion 80-2 of the O-ring fitting member 80. The O-ring retaining member 82 has a tubular shape as a whole, which has the same outer and inner diameters as those of the forward end portion of the valving element 44 of the female coupling member 12. The O-ring retaining member 82 is urged forward by a compression spring 86. When the female coupling member 12 is not coupled to the male coupling member 10, the O-ring retaining member 82 is in an advance position (FIG. 2) where it extends axially while hermetically engaging the radially inner side of the O-ring 78, thereby covering the O-ring 78. When the female coupling member 12 is coupled to the male coupling member 10 and, consequently, the forward end portion of the valving element 44 is inserted into the second valving element receiving part 70-2, the O-ring retaining member 82 is retracted by the forward end of the valving element 44 to reach a retract position (FIG. 1) where the outer peripheral surface of the forward end portion of the valving element 44 is hermetically engaged with the O-ring 78.

A valving element 89 is fitted in the valve fitting part 70-4. The valving element 89 is urged to press against a valve seat 88 by a compression spring 87. When a female coupling member is coupled to the male coupling member, the valving element 89 is forced to separate from the valve seat 88 by a fluid flowing into the male coupling member from the female coupling member.

Figure 4:
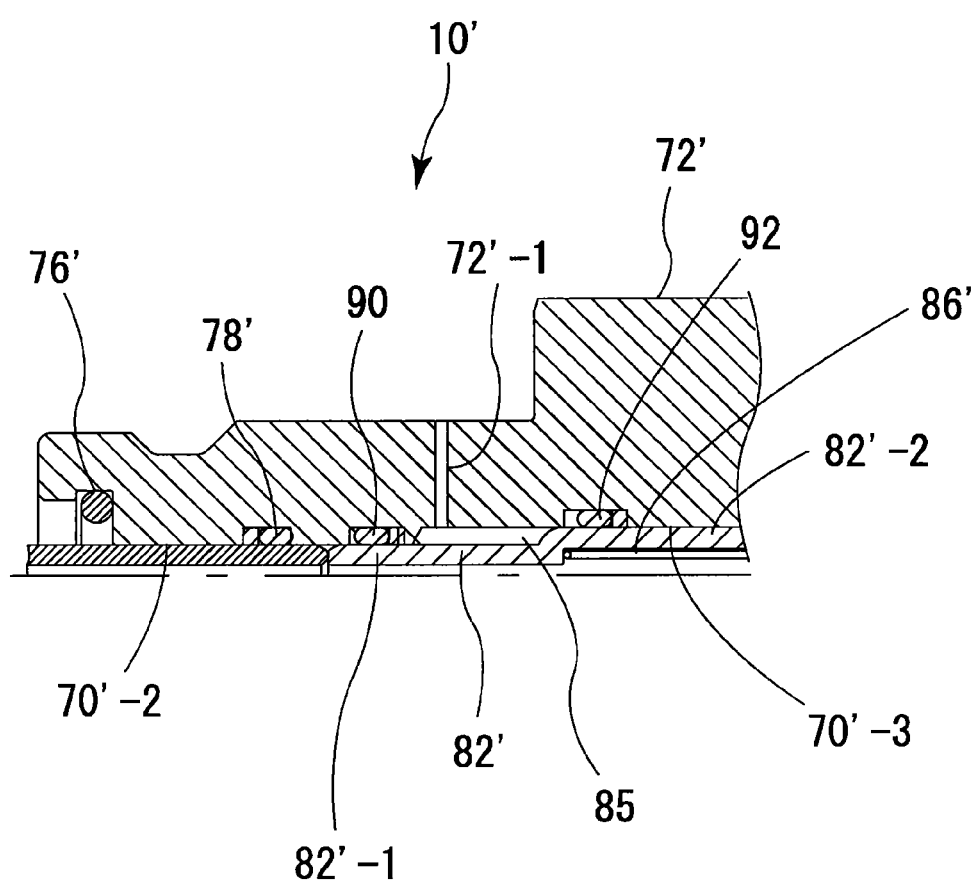
FIG. 4 is a longitudinal sectional view showing a state where the same female coupling member as that shown in FIGS. 1 and 2 is coupled to a male coupling member according to another embodiment.
Figure 5:
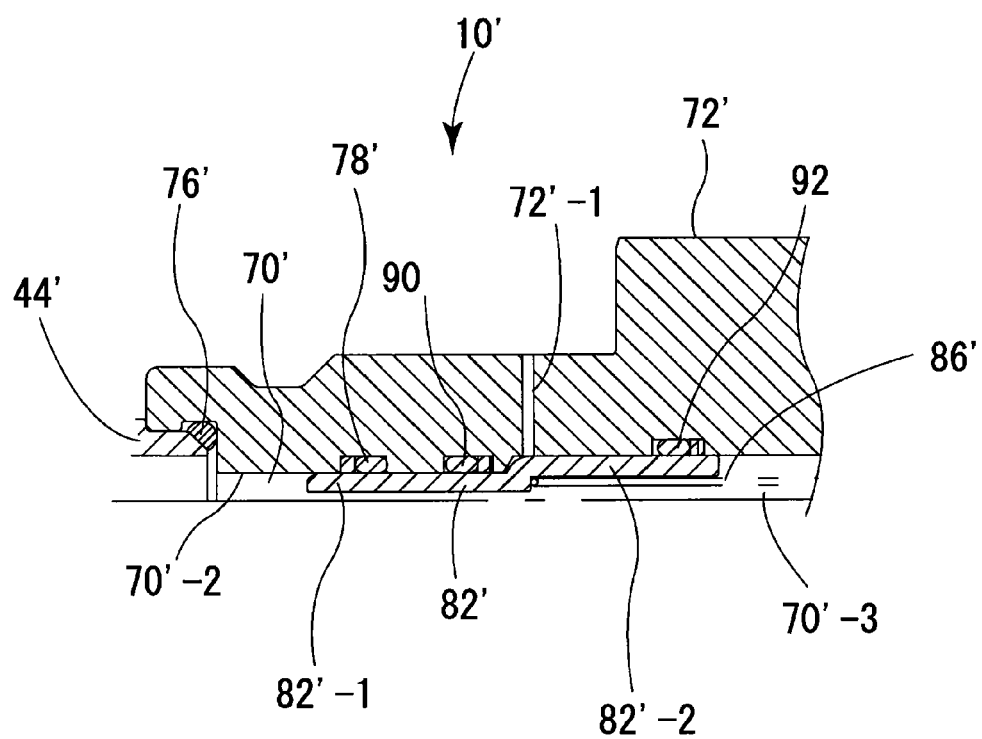
FIG. 5 is a longitudinal sectional view showing a state where the same female coupling member as that shown in FIG. 3 is coupled to the same male coupling member as that shown in FIG. 4.
Figure 6:
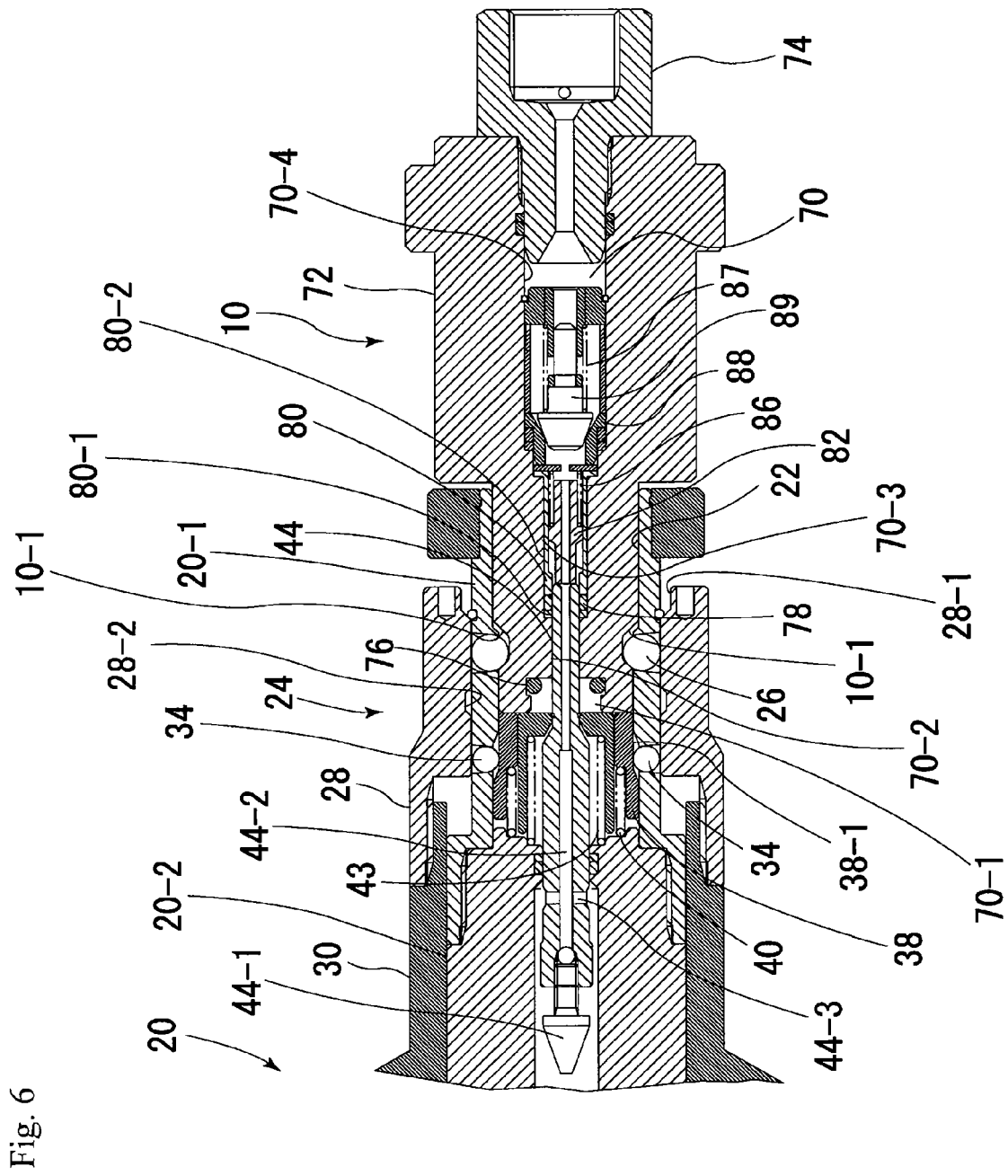
FIG. 6 is an enlarged view of an essential part of FIG. 1.

FIGS. 4 and 5 show an essential part of another embodiment of the male coupling member 10' according to the present invention. The male coupling member 10' uses the pressure of a fluid passed through the male coupling member 10' as a means for urging the O-ring retaining member 82' forward in place of the compression spring 86 used in the male coupling member 10 shown in FIGS. 1 to 3. That is, the through-hole 70' of the male coupling member 10' has a ring retaining member fitting part 70'-3 at the rear of the second valving element receiving part 70'-2. The ring retaining member fitting part 70'-3 has a larger diameter than that of the second valving element receiving part 70'-2. The O-ring retaining member 82' has a first tubular portion 82'-1 extending in the axial direction thereof so as to cover the second O-ring 78' from the radially inner side thereof when the O-ring retaining member 82' is in the above-described advance position. The O-ring retaining member 82' further has a second tubular portion 82'-2 that contiguously extends from the rear end of the first tubular portion 82'-1 and that is slidable in the above-described axial direction in the ring retaining member fitting part 70'-3. The male coupling member body 72' has a vent hole 72'-1 radially extending therethrough. As shown in FIG. 4, when the O-ring retaining member 82' is in the above-described retract position, the vent hole 72'-1 allows ventilation between a space 85 defined by the first tubular portion 82'-1 and the wall surface of the ring retaining member fitting part 70'-3 and the outside of the male coupling member body 72', thereby enabling the O-ring retaining member 82' to move smoothly in the axial direction. Third and fourth O-rings 90 and 92 are fitted to the inner peripheral surface of the male coupling member body 72' to prevent leakage of a fluid between the inner peripheral surface of the male coupling member body 72' and the O-ring retaining member 82.

In the male coupling member 10', the pressure-receiving area of the O-ring retaining member 82' that is subjected to the fluid pressure in the fluid passage 70' in the axial direction is larger toward the front than toward the rear of the male coupling member. Accordingly, when the male coupling member 10' is coupled to a female coupling member handling a fluid under a lower pressure, i.e. 25 MPa or 35 MPa, the O-ring retaining member 82' is pressed forward by the fluid in the fluid passage 70'.

In the foregoing description of the pipe coupling according to the present invention, the fluid pressures of 25 MPa, 35 MPa, 50 MPa and 70 MPa are one example. The present invention is not necessarily limited to these fluid pressures.

The invention claimed is:

1. A male coupling member selectively couplable to a first female coupling member and a second female coupling member, said first female coupling member and second female coupling member each including:
   a tubular female coupling member body having a through-hole extending from a forward end to a rear end thereof, wherein a forward end portion of said through-hole is defined as a male coupling member receiving part; and
   a tubular valving element provided in said through-hole to extend in an axial direction of said through-hole to open and close said through-hole;
   wherein a forward end portion of said valving element of said first female coupling member has a first outer diameter, and a forward end portion of said valving element of said second female coupling member has a second outer diameter smaller than said first outer diameter;
   said male coupling member comprising:
   a tubular male coupling member body having a through-hole extending from a forward end to a rear end thereof;
   said male coupling member body having a forward end portion with an outer diameter that allows said forward end portion to be slidably inserted into the male coupling member receiving part of the female coupling member body of either of said first and second female coupling members;
   said through-hole of said male coupling member body having a first valving element receiving part and a second valving element receiving part formed in order from a forward end toward a rear end thereof;
   said first valving element receiving part being adapted to receive the forward end portion of said valving element of said first female coupling member while slidably engaging said forward end portion when said forward end portion of said male coupling member body is slidably inserted into said male coupling member receiving part of said first female coupling member;
   said second valving element receiving part being adapted to receive the forward end portion of said valving element of said second female coupling member while slidably engaging said forward end portion when said forward end portion of said male coupling member body is slidably inserted into said male coupling member receiving part of said second female coupling member;
   said male coupling member body having:
   a first O-ring that hermetically engages an outer peripheral surface of the forward end portion of said valving element of said first female coupling member received in said first valving element receiving part;
   a second O-ring that hermetically engages an outer peripheral surface of the forward end portion of said valving element of said second female coupling member passed through said second valving element receiving part; and
   an O-ring retaining member that is displaceable between an advance position where said O-ring retaining member is positioned radially inside said second O-ring to engage said second O-ring and a retract position where when said male coupling member is coupled to said second female coupling member, said O-ring retaining member is displaced backward from said advance position by a forward end of the valving element of said second female coupling member, thereby allowing the outer peripheral surface of the forward end of said valving element to engage the second O-ring.

2. A male coupling member according to claim 1, wherein said through-hole of said male coupling member has an O-ring fitting part at a rear of said second valving element receiving part, said O-ring fitting part having a larger diameter than that of said second valving element receiving part;
   said O-ring fitting part having a tubular O-ring fitting member that is inserted and secured therein concentrically therewith to fit said second O-ring in said O-ring fitting part.

3. A male coupling member according to claim 2, wherein said O-ring fitting part has a smaller diameter than that of the first valving element receiving part.

4. A male coupling member according to claim 3, wherein said O-ring retaining member is a tubular member axially displaceably fitted in said O-ring fitting part and urged into said advance position.

5. A male coupling member according to claim 4, wherein in said advance position, said O-ring retaining member extends so as to contact an inner peripheral surface of said O-ring fitting member to cover said second O-ring from a radially inner side thereof.

6. A male coupling member according to claim 1, wherein said through-hole has a ring retaining member fitting part at a rear of the second valving element receiving part, said ring retaining member fitting part having a larger diameter than that of the second valving element receiving part;
   said O-ring retaining member having:
   a first tubular portion extending in said axial direction so as to cover said second O-ring from a radially inner side thereof when said O-ring retaining member is in said advance position; and
   a second tubular portion that contiguously extends from a rear end of said first tubular portion and that is slidable in said axial direction in said ring retaining member fitting part.

7. A male coupling member according to claim 6, wherein said male coupling member body has a vent hole that allows, when said O-ring retaining member is in said retract position, ventilation between a space defined by the first tubular portion of said O-ring retaining member and a wall surface of the ring retaining member fitting part and an outside of said male coupling member body.

8. A pipe coupling comprising a first female coupling member and a second female coupling member, said first female coupling member and second female coupling member each including:
   a tubular female coupling member body having a through-hole extending from a forward end to a rear end thereof, wherein a forward end portion of said through-hole is defined as a male coupling member receiving part; and
   a tubular valving element provided in said through-hole to extend in an axial direction of said through-hole to open and close said through-hole;
   wherein a forward end portion of said valving element of said first female coupling member has a first outer diameter, and a forward end portion of said valving element of said second female coupling member has a second outer diameter smaller than said first outer diameter;
   said pipe coupling further comprising a male coupling member selectively couplable to said first female coupling member and second female coupling member, said male coupling member comprising:
   a tubular male coupling member body having a through-hole extending from a forward end to a rear end thereof;
   said male coupling member body having a forward end portion with an outer diameter that allows said forward end portion to be slidably inserted into the male coupling member receiving part of the female coupling member body of either of said first and second female coupling members;

said through-hole having a first valving element receiving part and a second valving element receiving part formed in order from a forward end toward a rear end thereof, said first valving element receiving part being adapted to receive the forward end portion of said valving element of said first female coupling member while slidably engaging said forward end portion when said forward end portion of said male coupling member body is slidably inserted into said male coupling member receiving part of said first female coupling member;

said second valving element receiving part being adapted to receive the forward end portion of said valving element of said second female coupling member while slidably engaging said forward end portion when said forward end portion of said male coupling member body is slidably inserted into said male coupling member receiving part of said second female coupling member;

said male coupling member body having:

a first O-ring that hermetically engages an outer peripheral surface of the forward end portion of said valving element of said first female coupling member received in said first valving element receiving part;

a second O-ring that hermetically engages an outer peripheral surface of the forward end portion of said valving element of said second female coupling member passed through said second valving element receiving part; and an O-ring retaining member that is displaceable between an advance position where said O-ring retaining member is positioned radially inside said second O-ring to engage said second O-ring and a retract position where when said male coupling member is coupled to said second female coupling member, said O-ring retaining member is displaced backward by a forward end of said valving element of said second female coupling member, thereby allowing the outer peripheral surface of said valving element to engage said second O-ring.

9. A pipe coupling according to claim 8, wherein said through-hole has an O-ring fitting part at a rear of the second valving element receiving part, said O-ring fitting part having a diameter that is larger than that of the second valving element receiving part but smaller than that of the first valving element receiving part;

said O-ring fitting part having a tubular O-ring fitting member that is inserted and secured therein concentrically therewith to fit said second O-ring in said O-ring fitting part;

said O-ring retaining member being a tubular member axially displaceably fitted in said O-ring fitting part and urged into said advance position.

* * * * *